United States Patent [19]

Castagno

[11] Patent Number: 5,419,401
[45] Date of Patent: May 30, 1995

[54] OIL-PNEUMATIC LOAD CONTROL DEVICE

[75] Inventor: Roberto C. Castagno, Concepción del Uruguay, Argentina

[73] Assignee: AVEC S.R.L., Concepcion del Uruguay, Argentina

[21] Appl. No.: 92,811

[22] Filed: Jul. 19, 1993

[30] Foreign Application Priority Data

Jul. 17, 1992 [AR] Argentina ............... 322770
Sep. 24, 1992 [AR] Argentina ............... 323257

[51] Int. Cl.⁶ .................... A01B 63/111; F16D 31/02
[52] U.S. Cl. .......................... 172/4; 111/200; 111/906; 60/418; 60/473; 60/571
[58] Field of Search ............... 60/567, 571, 572, 573, 60/581, 413, 418, 473, 474, 475; 91/4 R; 417/122; 172/4; 111/200, 906

[56] References Cited

U.S. PATENT DOCUMENTS

| | | | |
|---|---|---|---|
| 3,529,424 | 9/1970 | Cibie | 60/571 |
| 4,089,172 | 5/1978 | Junttila | 60/567 |
| 4,872,310 | 10/1989 | Kaye | 60/567 |
| 5,033,397 | 7/1991 | Colburn, Jr. | 111/200 X |
| 5,234,060 | 8/1993 | Carter | 172/4 X |

FOREIGN PATENT DOCUMENTS 2560733  9/1985  France ..................... 172/4

Primary Examiner—Edward K. Look
Assistant Examiner—Hoang Nguyen
Attorney, Agent, or Firm—Jacobson, Price, Holman & Stern

[57] ABSTRACT

A load control device applicable on agricultural machinery in general and in particular on machinery used for direct planting, so that the working components in contact with the ground will maintain the same load constantly at all times for any ground profile condition. An oil-pneumatic device is provided with a fluid compressor connectable to the tractor's power take-off by a cardan shaft and an electromagnetic clutch that can be powered from the tractor's electrical system or by an independent source, including a compressor with its associated pressurestat which governs it in order to maintain the air pressure required by the circuit. The compressor supplies a tank of compressed air, to which is connected at least one hydraulic cylinder whose upper and lower chambers are each connected to intermediate air and oil collecting reservoirs. The tank and reservoirs which supply the hydraulic cylinder are interconnected alternately by a two-way electrovalve in each of its two positions, while the reservoirs in turn in each position of the valve alternate their connection with the atmosphere through a filtering medium.

6 Claims, 3 Drawing Sheets

OIL-PNEUMATIC LOAD CONTROL DEVICE

FIELD OF THE INVENTION

This invention relates to an oil-pneumatic load control device applicable on agricultural machinery, for the object of enabling the machine on which it is used to have the same load at all times, applied constantly on the tools in contact with the ground which take the form of tilling components, exactly copying all unevenness and irregularities of the terrain as the machine passes over it.

BACKGROUND OF THE INVENTION

As is well known, the application of the direct planting system for growing different crops has led to a need to design machinery compatible with this type of tillage. As a result, there are machines on the market for direct planting of wheat, soybeans, linseed, rice, and the like. In the particular case of rice, its cultivation holds a dominant position in the regional economies of vast areas of Argentina's coastal and northeastern regions, including Entre Rios, Corrientes, Chaco, Formosa and Santa Fe. This cultivation activity requires a technology developed in accordance with its different stages of production, of which one of the most important is planting.

Planting determines the number of plants and their distribution in the ground, in relation to their proper subsequent development. These factors in turn will dictate the final crop yield, which will determine the economic results of the operation.

After a thorough analysis of the supply of domestic and imported direct planting machines currently on the market, the conclusion may be reached that the technology in use is based on the incorporation of machinery designed for another type of crop such as wheat, linseed, and the like, and adapted for cultivation of rice with varying degrees of success. This adaptation is the result of mechanical ingenuity aimed at solving the specific problems brought about by the special characteristics of rice cultivation.

The observations, analyses and conclusions obtained on this subject have been made by official agencies of the Argentine republic such as INTA, intermediate institutions such as AAPRESID, planters' associations, cooperatives, mass communication media, specialized magazines, and the like.

These conclusions outline the problems existing today and may be summarized as follows:

The planting machines currently used in cultivation systems with conventional tilling were designed to operate in similar soil preparation conditions for the various crops. Therefore, the issues of functionality were worked out almost entirely under similar premises.

As a result of the incorporation of the direct planting system, which has the special feature (as is well known) of requiring no tilling prior to planting, problems arose which were intrinsic to this process and were not resolved satisfactorily by the machines used up to that time.

This situation caused concern in various sectors connected with that activity, and the industry responded by manufacturing specific machinery for direct planting.

After observing the machinery in action, it was concluded that one of the most significant problems was occurring in the system of loads on the furrow-opening disks and the wheels that compact the planting furrow.

The load systems currently in use are based on single, multiple or intercombined springs actuated by levers, which gauge the load selected for the various ground conditions.

These systems have the disadvantage of not having a constant load during variations of the stroke of the arms that hold the disks or compacting wheels and, in accordance with irregularities in ground relief, they often partially or even completely lose the loads or become fully compressed, bringing said loads to values that are intolerable for the function they are supposed to perform.

Let us assume that the machine encounters raised or undulated terrain. When the furrow-opening wheel is at the highest point, the compacting wheel may be in the air because the associated spring is not long enough to enable it to rest on the ground again. When the compacting wheel is passing over the highest part of the mound, the furrow-opening disk may be in the air, out of contact with the ground.

It has also been shown that the effects of unloading and overloading the furrow-opening disks sometimes prevent these components from performing their function, which should be exact as regards their capacity for making the planting furrow at a preestablished constant depth. This is because of the loss of contact or small loads on the ground when passing over low-relief terrain, or because of exaggerated furrow depths in the case of high-relief terrain. In the latter case, overloads can also cause wear and tear or failure of some components of the mechanism.

The above observations show that the load control systems used by the majority and known up to the present time do not ensure proper depth of the planting furrow, resulting in a significant decrease in agricultural performance.

SUMMARY OF THE INVENTION

It is an object of this invention to have an oil-pneumatic device for applying loads, particularly on the disks and compacting wheels of agricultural cultivation machinery. The device of the invention has been specially prepared to solve the problems generated by the use of conventional machines for land cultivation known as direct tillage or zero tillage, wherein control of the load of the aforementioned tools takes on particular importance and must be carefully adjusted.

In order to solve the outlined problems and achieve a load control device applicable on agricultural machinery in general and in particular on machinery used for direct planting, so that the working components in contact with the ground will maintain the same load constantly at all times for any ground profile condition, the applicant has devised an oil-pneumatic device provided with a fluid compressor connectable to the tractor's power take-off by means of a Cardan shaft and an electromagnetic clutch that can be powered from the tractor's electrical system or by means of an independent source, including a compressor means with its associated pressurestat which governs it in order to maintain the air pressure required by the circuit. The compressor supplies a tank of compressed air, to which is connected at least one hydraulic cylinder whose upper and lower chambers are each connected to intermediate air and oil collecting reservoirs. The tank and reservoirs which supply the hydraulic cylinder are interconnected alternately by means of a two-way electrovalve in each of its two positions, while the reservoirs in turn in each position of the valve alternate their connection with the atmosphere through a filtering medium.

Although the aforementioned arrangement effectively solves the problems that led to its implementation, day-to-day experience led to the expediency of further improving the operation of the system, particularly for special cases such as smooth terrain where it is advisable to have the pressure relatively low so that the tilling instruments do not go too deep and thus adversely affect direct planting. The fact is that, when pressure is reduced, the system might not achieve enough force to lift the machinery, to turn around at the end of each row in the field, or simply to move the machine away after tilling is completed.

This new problem led the applicant to improve the invention by incorporating a second compressed-air tank with its pressure controlled properly by means of a regulating valve, and to control the system with the addition of a second two-way valve, in the manner described below.

Basically, the improvements include two compressed-air tanks, of which the first tank, which is connected directly to the compressor and has a pressurestat, is connected via a pressure regulator to the second tank. The first tank is connected via a two-way valve to a first intermediate air and oil collecting reservoir and one of the enclosures of the hydraulic cylinder, while the second tank is connected via a second two-way valve to the second intermediate air and oil collecting reservoir connected to the opposite enclosure of the hydraulic cylinder, and the two two-way valves open in one of their positions to the atmosphere and are operationally interlocked. This process will be discussed in greater detail in the following paragraphs.

For purposes of understanding the invention, consisting of an oil-pneumatic load control device, so that it can be easily put into practice, an exact description of a preferred form of embodiment will be given in the following description, with reference to the accompanying illustrative drawings, the entirety given as a purely demonstrative but not limitative example of the invention, whose components may be selected from among various equivalents without thereby departing from the principles of the invention.

DETAILED DESCRIPTION OF THE PREFERRED EMBODIMENTS

Figure 1:
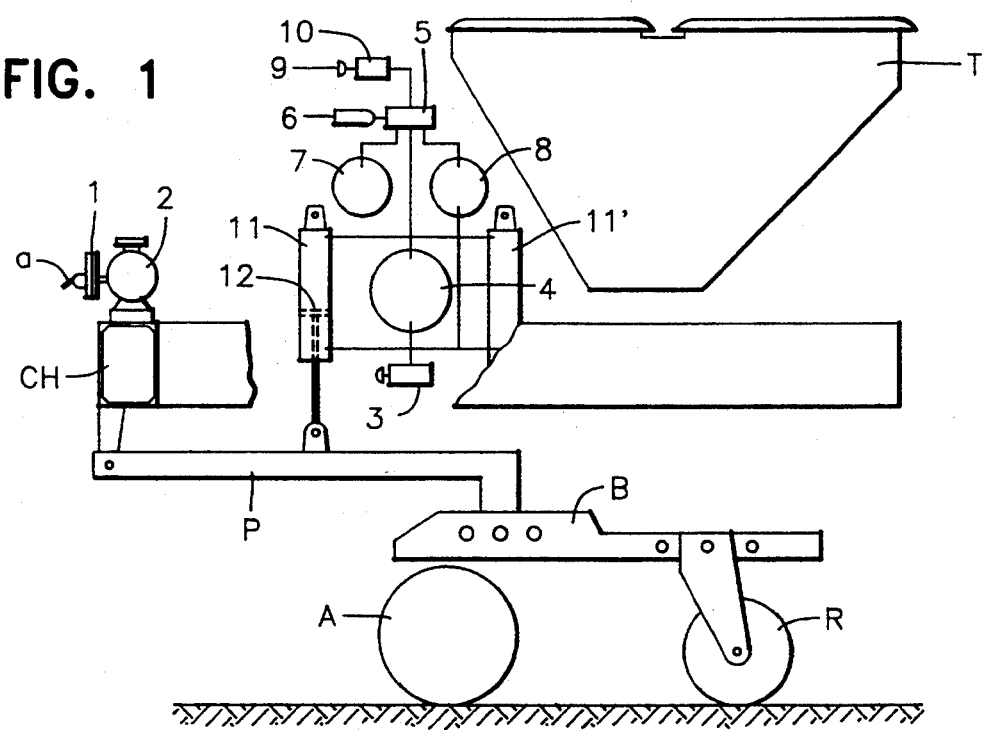
FIG. 1 consists of a schematic view of a machine that includes the oil-pneumatic device of the invention. The figure includes a second cylinder that operates another arm of the machine. The number thereof may vary with the working capacity of the machine.

In the aforementioned figures, the same reference characters indicate the same or corresponding parts.

According to the illustration in FIG. 1, the device is coupled to the tractor's power take-off (not shown) from its Cardan shaft "a" through an electromagnetic clutch 1. The power for this clutch can be supplied through the tractor's system, or by means of an independent signal—for example, an auxiliary battery, or the like. In this manner, the air compressor 2 starts up in response to an electrical signal provided by the pressurestat 3, which works with the desirable air pressure to be maintained in at least one first compressed-air tank 4, which is supplied by said compressor. The compressed-air tank 4 is connected, via a two-way electrovalve 5 operated by the solenoid 6, to two intermediate reservoirs 7 and 8 and to a vent to the atmosphere 9 via a filter 10.

The intermediate collecting reservoir 7 is connected to the upper enclosure of the hydraulic cylinder 11 and 11' (there is, in a special instance, one cylinder for each arm on the machine).

The other intermediate collecting reservoir 8 is connected to the lower enclosure of each hydraulic cylinder. The enclosures are separated by the cylinder piston 12.

Each piston shaft is articulated with the respective arm P, which in turn is articulated with the chassis CH of the farm machine.

The arm P is articulated in a registrable position with respect to the beam B that holds the furrow-opening component A and the compacting wheel R, whose position is also registrable with respect to said beam.

The figure also illustrates the hopper T, in this case an integral part of the planting arrangement.

Figure 2:
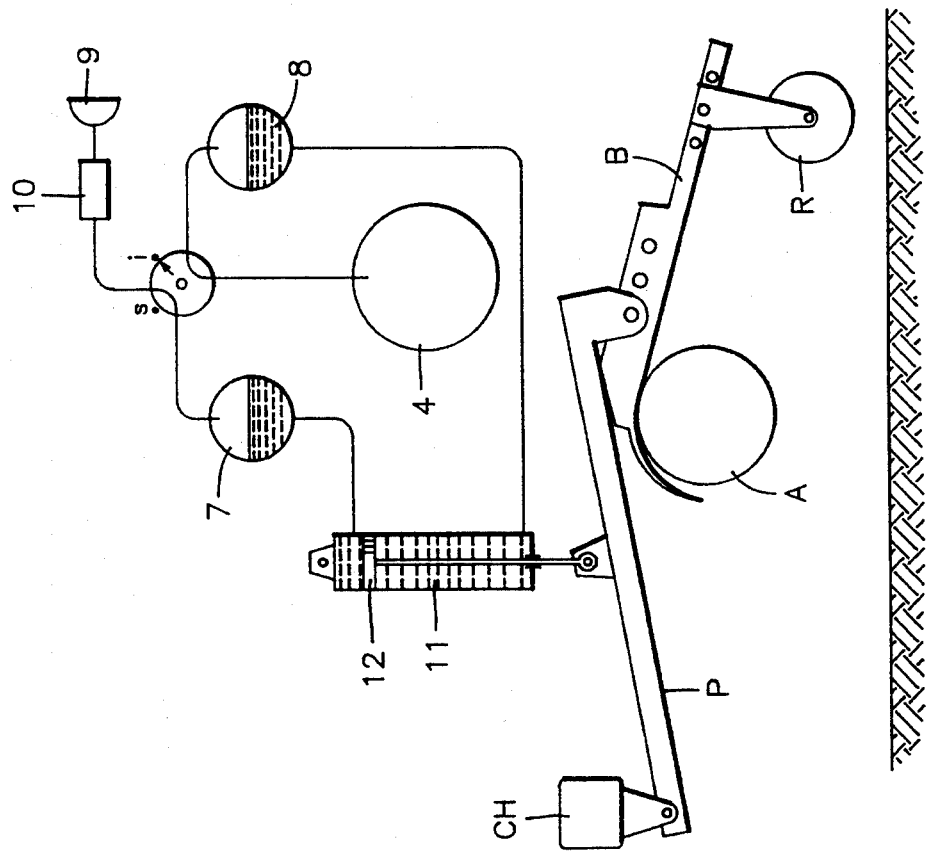
FIG. 2 shows in another schematic view the oil-pneumatic circuit provided for normal operation of the machine.

FIG. 2 illustrates the working position of the machine with the actuation of the load cylinder 11. In order to activate the load application arrangement, the electrovalve 5 is controlled by means of an electric pulse to its solenoid 6 (FIG. 1), which pulse is provided by a switch (not illustrated) actuated by the machine operator. Thus, with valve 5 in position s, the compressed-air tank 4 is connected to the air-oil collecting reservoir 7 associated with the upper part of the hydraulic cylinders 11. Consequently, the pressure in tank 4 is transmitted through the collector 7 with the upper part of the aforesaid cylinder 11, which through its piston 12 generates a load on the arms P that hold the beams B connected to the furrow-opening disks A and compacting wheels R.

In this position s, the electrovalve depressurizes the lower part of the cylinder 11, inasmuch as it opens to the atmosphere through filter 10 and vent 9, via the respective air-oil collecting reservoir 8.

Thus, in valve position s, the pressure in the upper chamber of cylinder 11 is greater than atmospheric pressure and has the value calculated previously, according to the conditions that the arrangement is to meet. This value is adjusted by the pressurestat 3 and is the value maintained in the compressed-air tank and oil-pneumatic circuit. In the lower chamber of cylinder 11 there will be no excessive rise in pressure and the pressure will be equal to atmospheric pressure.

Figure 3:
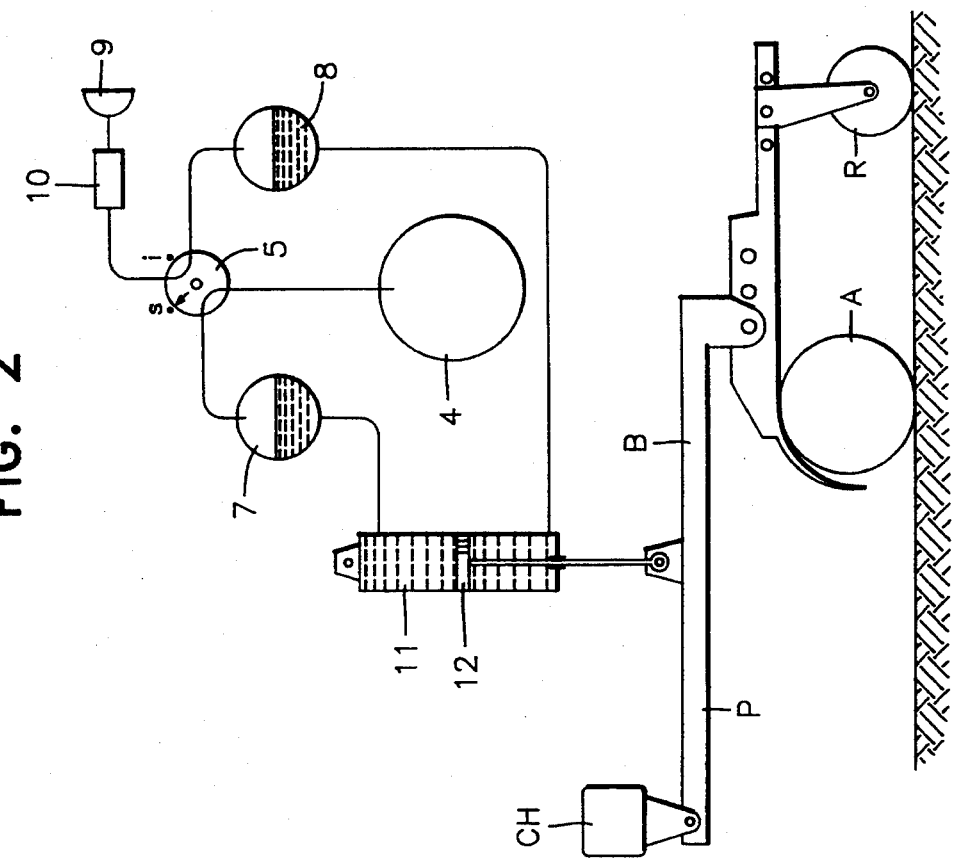
FIG. 3 is a diagram of the oil-pneumatic circuit for the arms-raised machine position.

FIG. 3 shows the inverse operation, wherein the arms P are raised when this position is required—for example, at the end of the machine's operating cycle.

Switching the position of the electrovalve to valve position i establishes the circuit so that the lower part of the cylinder 11, which was at atmospheric pressure, to receive the working pressure that exists in tank 4.through the intermediate collecting reservoir 8, whose pressure rises to the tank 4 pressure. At the same time, the upper chamber of cylinder 11 is connected via intermediate collecting reservoir 7 to the atmosphere via filter 10 and vent 9. In this situation, the piston 12 raises up, pulling with it the arm P, its beam B and the furrow-opening wheels A and compactor R, as shown.

Figure 4:
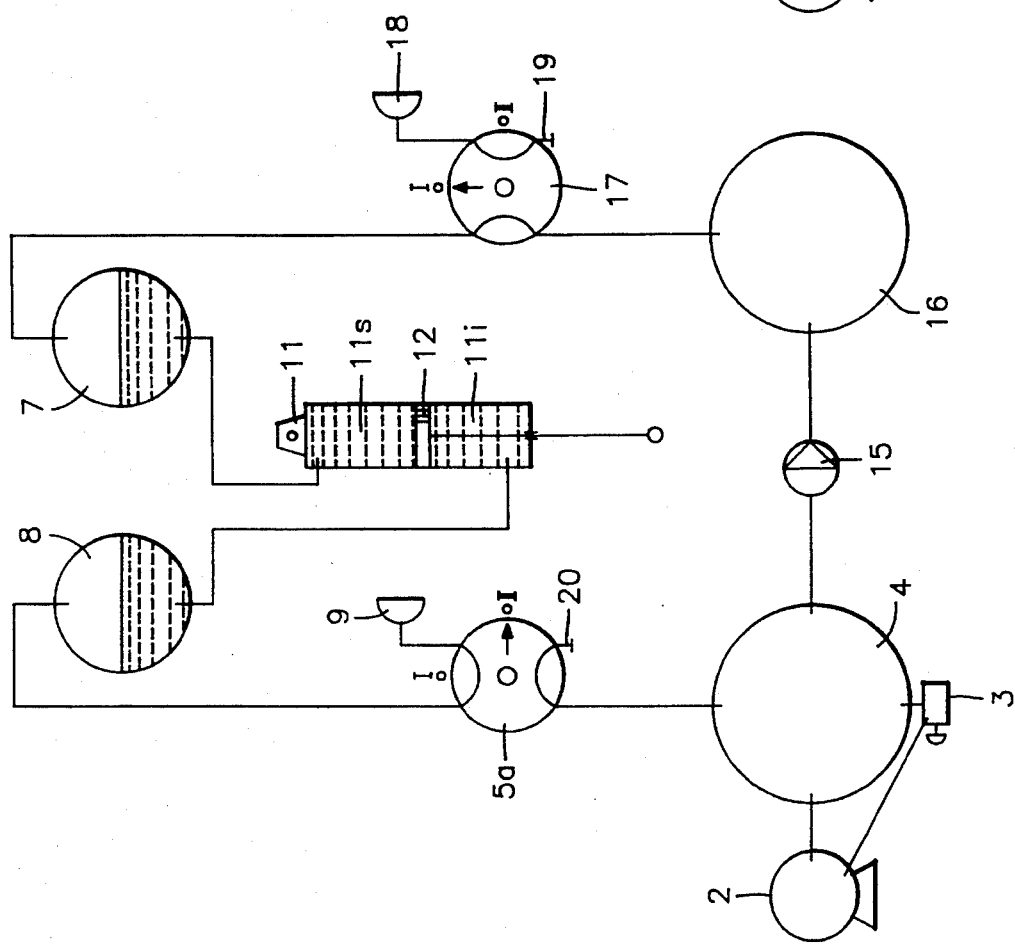
FIG. 4 illustrates the variation of the invention that incorporates a second compressed-air tank. The figure shows one of the operating positions of the device of the invention, pertaining to pistons activated, or the working position of the farm machine.

FIG. 4 shows how the compressor 2, governed by the pressurestat 3, fills the tank 4 with compressed air.

Tank 4 is connected via valve 5a to the intermediate air and oil collecting reservoir 8. This reservoir is hydraulically connected via the associated pipes to the lower enclosure 11i of the hydraulic piston 11, inside of which is displaceably mounted piston 12 connected to the arm that actuates the beam that holds the tilling implements (components not shown).

Valve 5a has the vent to the atmosphere 9, which may have filtering elements if it is considered necessary.

The first compressed-air tank 4 is connected via a pipe to the pressure regulating valve 15, which connects to a second tank 16.

The second tank 16 connected in turn to a second valve 17 with a vent to the atmosphere 18. On both two-way valves 5a and 17, the vents designated 19 and 20 are blocked.

The second two-way valve 17 is connected to the second intermediate reservoir 7, which in turn is hydraulically connected to the upper enclosure 11s of the hydraulic cylinder 11.

Figure 5:
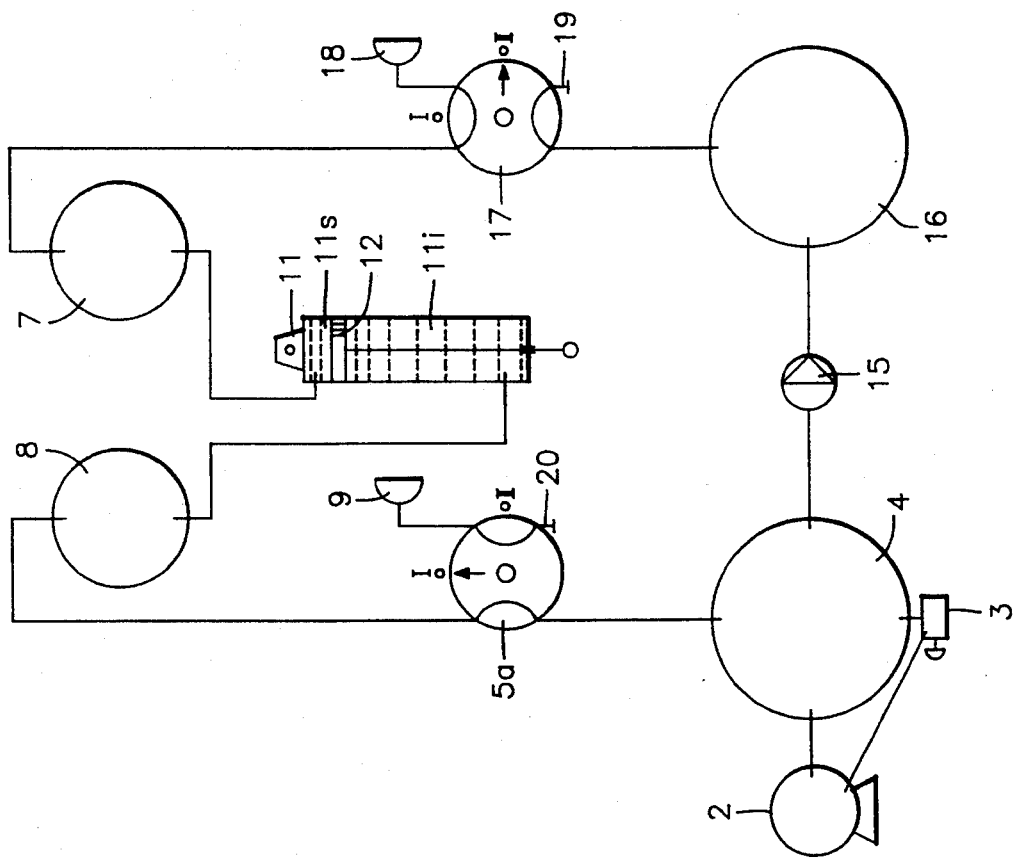
FIG. 5 illustrates the other operating position with the alternate arrangement, showing the pistons deactivated with the resulting lifting of the working machinery.

The functional relationship of FIGS. 4 and 5 is as follows: Considering the position shown in FIG. 4 pertaining to the piston 12 or activated pistons, the compressor 2 charges the first compressed-air tank 4 controlled via the pressurestat 3. At the same time, the second tank 16 is supplied from tank 4 via the pressure regulator 15 until it reaches the selected pressure.

The second tank 16, by means of the two-way valve 17 in position I, supplies the intermediate air-oil collecting reservoir 7 and, consequently, the upper enclosure 11s of the hydraulic cylinder 11. Its lower enclosure 11i opening to the intermediate air-oil collecting reservoir 8 is connected to the two-way valve 5a which is in position II as dictated by valve 17 to which it is interlocked to operate synchronously, which will cause the pneumatic circuit to open via vent 9 to the atmosphere, discharging pressure from the lower enclosure 11i and thus lowering the working components to their operating position on the ground, dictated by actuation of the piston 12.

In the resting position of the machinery shown in FIG. 5, the first pressurized-air tank 4 is opened, via the first valve 5a in position I, to the intermediate air-oil collecting reservoir 8 and, via the associated pipes, to the lower enclosure 11i of cylinder 11. Meanwhile, the upper enclosure 11s of the cylinder will be opened to the atmosphere via the second reservoir 7 and valve 17 in position II as dictated by the first valve 5a. In this way, the piston 12 of the cylinder moves upward, lifting the machinery.

With the modified arrangement described, maximum power conditions always exist to lift the machinery in order to turn around at the ends of rows during planting and also for moving the machinery off the field. At the same time, by means of the facility introduced by the second tank and its regulator, it is possible to calibrate the optimum load for the machinery according to the nature and condition of the terrain, without losing efficiency in any of its movements.

FIGS. 6a–6d illustrate a working situation of the machine wherein it must travel over a rise in terrain similar to that shown.

In position 6a, the machine moves forward with the load cylinder 11 activated, and thus the furrow-opening component A and the compacting wheel R rest normally on the flat ground.

Figure 6A:
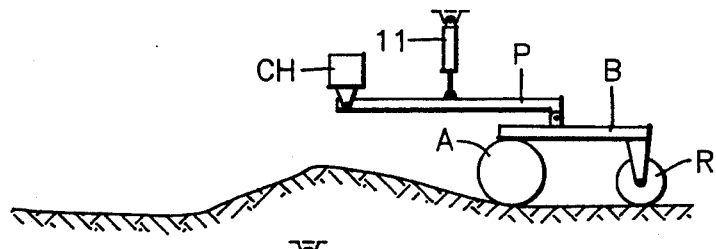
FIGS. 6a through 6d are functional schematic representations with various operating sequences of the machine traveling over a rise in the terrain.
Figure 6B:
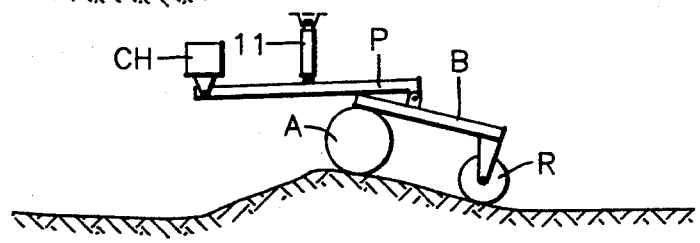
Figure 6C:
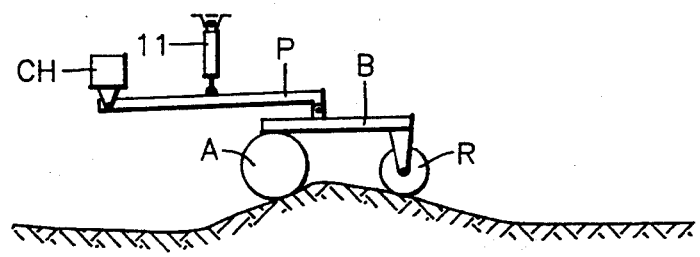
Figure 6D:
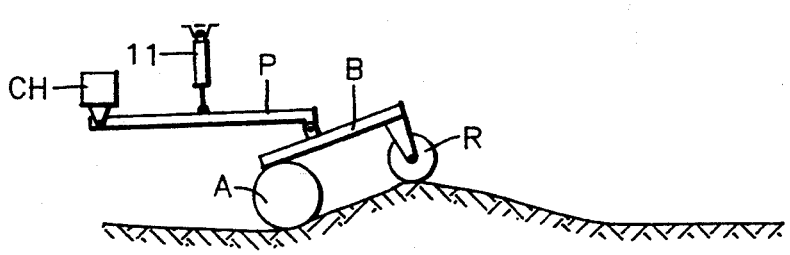

In position 6b, the furrow-opening component A raises up and the compacting wheel R begins to climb the rise. The load cylinder 11 absorbs the height difference with its piston, making the oil-pneumatic fluid circulate through its pressure circuit as a result of the compressivity of the air, to restore it gradually while passing over the mound, as shown in FIGS. 6c and 6d. At all times the load has remained unchanged, within certain small allowable limits which do not alter the work being performed by the machine.

This operating sequence shows that the furrow is always opened and covered over completely normally, owing to the structure and arrangement of the machine.

The foregoing paragraphs have established the components of the version of the invention, with an explanation of their nature, supplemented with the functional and operational relationship of the components and the performance they provide, and thus no further assertions are needed on the subject.

In this manner, one of the constructive possibilities that provide an explanation of the invention and the manner in which it works have been described. The documentation is supplemented with the synthesis of the invention contained in the claims, which are annexed hereto.

What is claimed:

1. An oil-pneumatic load control device for agricultural machinery to maintain a constant load on an arm that holds working components thereof, said oil-pneumatic load control device comprising:
   compressor means for compressing air,
   a tractor power take-off shaft,
   means for coupling said compressor means to said tractor power take-off shaft,
   at least one compressed-air tank provided with a pressurestat and connected to said compressor means,
   a two-way valve,
   said two-way valve, in a first position, connecting said at least one compressed-air tank via an intermediate air-oil collecting reservoir to an upper enclosure of at least one hydraulic cylinder while simultaneously connecting a lower enclosure of said at least one hydraulic cylinder via another intermediate air-oil collecting reservoir to a vent to the atmosphere,
   said two-way valve, in a second position, connecting said at least one compressed-air tank via said another intermediate air-oil collecting reservoir to said lower enclosure of said at least one hydraulic cylinder while simultaneously connecting said upper enclosure of said at least one hydraulic cylinder via said intermediate air-oil collecting reservoir to said vent to the atmosphere, and a piston of said at least one hydraulic cylinder being articulated with an arm of a machine that holds working components.

2. An oil-pneumatic load control device according to claim 1, wherein said at least one compressed-air tank is connected via a pressure regulator to another compressed-air tank while said at least one compressed-air tank is connected via said two-way valve to said intermediate air-oil collecting reservoir and one of the upper and lower enclosures of said at least one hydraulic cylinder, while said another compressed-air tank is connected via a second two-way valve to said another intermediate air-oil collecting reservoir to the other of the upper and lower enclosures of said at least one hydraulic cylinder, said two-way valve and said second two-way valve are operationally interlocked.

3. An oil-pneumatic load control device according to claim 1, wherein said means for coupling said compressor means to said tractor power take-off shaft includes an electromagnetic clutch operated by a contactor from a control console.

4. An oil-pneumatic load control device according to claim 1, wherein said vent to the atmosphere is provided with a filter.

5. An oil-pneumatic load control device according to claim 1, wherein said arm of said machine includes a beam on which are mounted a furrow-opening component and a compacting wheel.

6. An oil-pneumatic load control device for agricultural machinery to maintain a constant load on an arm that holds working components thereof, said oil-pneumatic load control device comprising:

compressor means for compressing air, a tractor power take-off shaft, means for coupling said compressor means to said power take-off shaft, a first compressed-air tank connected to said compressor means, a second compressed-air tank connected to said first compressed-air tank, a pressure regulator located in the connection between said first compressed-air tank and said second compressed-air tank, a first two-way valve, a second two-way valve operationally interlocked with said first two-way valve, a first intermediate air-oil collecting reservoir, a second intermediate air-oil collecting reservoir, a first blocked vent, a second blocked vent, a first vent to the atmosphere, a second vent to the atmosphere, a hydraulic piston cylinder having an upper enclosure located on one side of a piston slidably mounted in a cylinder and a lower enclosure located on an opposite side of said piston, said lower enclosure being connected to said first intermediate air-oil collecting reservoir and said upper enclosure being connected to said second intermediate air-oil collecting reservoir, an arm of a machine holding working components, said arm being connected to said piston, said first two-way valve, in a first position, connects said lower enclosure via said first intermediate air-oil collecting reservoir with said first vent to atmosphere and connects said first compressed-air tank with said first blocked vent while simultaneously said second two-way valve, in a first position, connects said second compressed-air tank with said upper enclosure via said second intermediate air-oil collecting reservoir, and said first two-way valve, in a second position, connects said first compressed-air tank with said lower enclosure via said first intermediate air-oil collecting reservoir while simultaneously said second two-way valve, in a second position, connects said upper enclosure with said second vent to atmosphere via said second intermediate air-oil collecting reservoir and connects said second compressed-air tank to said second blocked vent.

* * * * *